United States Patent [19]
Godin

[11] Patent Number: 5,299,786
[45] Date of Patent: Apr. 5, 1994

[54] NOISE SUPPRESSION MEMBER

[75] Inventor: Roger R. Godin, Manchester, N.H.

[73] Assignee: Freudenberg-NOK General Partnership, Plymouth, Mich.

[21] Appl. No.: 32,307

[22] Filed: Mar. 17, 1993

[51] Int. Cl.$^5$ ............................................. B60G 11/52
[52] U.S. Cl. ....................................... 267/33; 267/166
[58] Field of Search .................. 267/33, 166, 167, 169, 267/166.1, 249, 286, 287, 180, 179

[56] References Cited

U.S. PATENT DOCUMENTS

| | | | |
|---|---|---|---|
| 1,928,918 | 10/1933 | Wilmot | 5/248 |
| 2,183,100 | 12/1939 | Holland | 267/9 |
| 2,801,841 | 8/1957 | Blythe | 267/33 |
| 3,051,469 | 8/1962 | Boschi | 267/33 |
| 3,096,084 | 7/1963 | Osterhoudt | 267/33 X |
| 3,161,407 | 12/1964 | Robin | 267/33 X |
| 3,711,917 | 1/1973 | Baumgras | 267/166 |
| 4,640,500 | 2/1987 | Shiau | 267/168 |
| 4,830,348 | 5/1989 | Seyler | 267/166 |
| 4,967,799 | 11/1990 | Bradshaw et al. | 138/121 |

FOREIGN PATENT DOCUMENTS

| | | | |
|---|---|---|---|
| 2643429 | 2/1989 | France. | |
| 0069123 | 4/1982 | Japan | 267/166 |
| 62-49037 | 3/1987 | Japan | 267/33 |
| 0155345 | 7/1987 | Japan | 267/33 |
| 1384852 | 3/1988 | U.S.S.R. | 267/166 |
| 0756416 | 9/1956 | United Kingdom | 267/33 |

*Primary Examiner*—Andres Kashnikow
*Assistant Examiner*—Peter M. Poon
*Attorney, Agent, or Firm*—Dinnin & Dunn

[57] ABSTRACT

A noise suppression apparatus for use with a spring. The apparatus includes a plurality of circular tubular members having a longitudinal slit in the tube wall and a radial slit. The slits allow the tubular members to be separated and disposed about the spring. Each of said circular tubes is interconnected by a web member. When the apparatus is snapped around the spring and the spring is compressed, any noise resulting from metal to metal contact will be suppressed by the apparatus.

13 Claims, 1 Drawing Sheet

NOISE SUPPRESSION MEMBER

BACKGROUND OF THE INVENTION

1. Field of the Invention

The present invention relates to a noise suppression member. More specifically, the invention relates to a multipart structure suitable for placement about the coils of a spring to suppress noise occurring during usage thereof.

2. Background of the Invention

Springs are used for a variety of applications, such as motor vehicle suspension systems. When used in vehicle suspension system a coil spring is placed between a control arm of a vehicle, upon which a wheel is mounted, and a portion of the vehicle frame. During vehicle operation, if the spring is deflected a sufficient distance contact between individual coils of the spring occurs and creates a noise which is best described as a squeak or clatter. The noise, while not affecting the performance of the vehicle, is irritating to the vehicle owner and may result in increased consumer complaints and warranty costs.

In an attempt to eliminate spring noise, an extruded tubular sheath having a longitudinal slit in a side thereof was placed over the spring coils to provide a cushion between the coils. While producing some success in noise reduction during spring operation, it proved difficult to keep the extruded tubular sheath on the spring because placing a generally straight and elongated tubular sheath over generally circular spring coils causes the inner portion of the tubular sheath to be placed in compression while the outer portion is placed in tension thereby creating wrinkles and a gap or opening in the tubular sheath adjacent the slit.

Additionally, spring dynamics during operation of the vehicle, i.e. elongation and compression of the spring, caused the tubular sheath to work its way free of the spring. As the spring moves from a fully compressed position to a fully elongated position the overall diameter of the spring changes, it is this change in diameter coupled with the preloading of the tubular sheath which causes the tubular sheath to work its way off of the spring.

Accordingly, it is an object of the present invention to provide a noise suppression device that can be disposed about the coils of a spring to reduce unwanted spring noise.

Another object of the invention is to provide a noise suppression device which can be disposed about and remain on the spring which will last and be functional as long as the life of the vehicle.

Other objects, features, and advantages of the present invention will become apparent from the subsequent description and the pending claims taken in conjunction with the accompanying drawings.

SUMMARY OF THE INVENTION

Briefly stated, the present invention relates to a noise suppression member disposed about a spring for reducing spring noise when the spring is deflected from a static position. In general, the invention includes a pair of tubular members interconnected by a web member. The tubular members are shaped such that they may be disposed about the spring while maintaining preloaded or induced stress at a minimum. Each tubular member includes a slit in the tube wall to enable the tubular member to be disposed about the spring.

DETAILED DESCRIPTION OF THE PREFERRED EMBODIMENT

Figure 1:
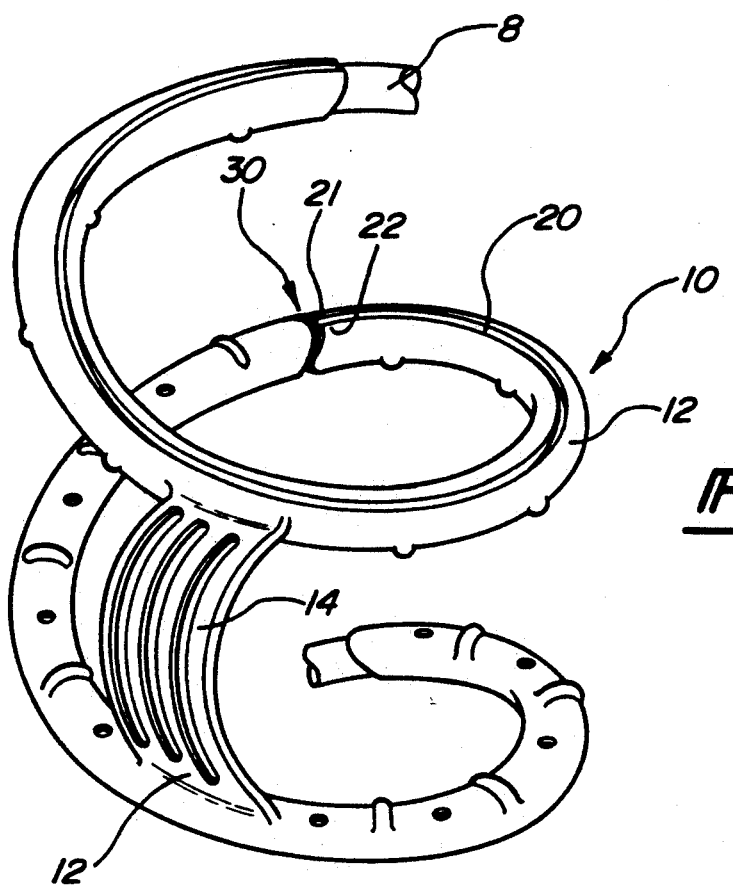
FIG. 1 is a partial perspective view of a coil spring utilizing a noise suppression member in accordance with the present invention.
Figure 2:
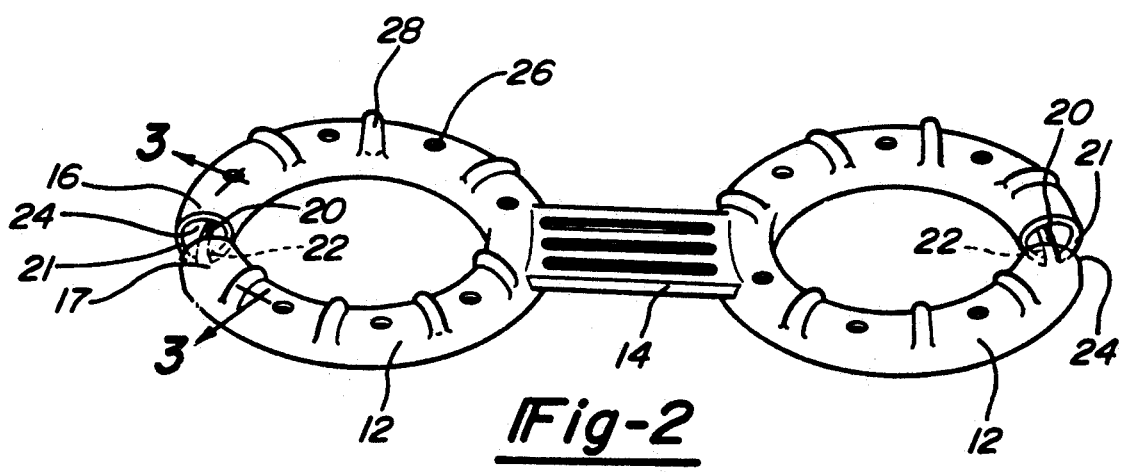
FIG. 2 is a perspective view of a noise suppression member in accordance with the invention.

Referring to the drawings, FIG. 1 illustrates a noise suppression member generally indicated at 10, for use in connection with a coil spring 8. As shown in FIG. 2, the noise suppression member 10 includes two circular or ring shaped tubular members 12 interconnected by a web member 14. The tube wall 18 of each tubular member 12 includes a slit forming a gap or opening 20 and forming side walls 21, 22. Additionally, the tubular members 12 are radially separated 24 at a position 180° from the web member 14 to form first 16 and second 17 ends of the tubular member 12. The gap or opening 20 and radial separation 24 enable each of the tubular members 12 to be attached to the coil spring 8 as shown in FIG. 1.

Figure 3:
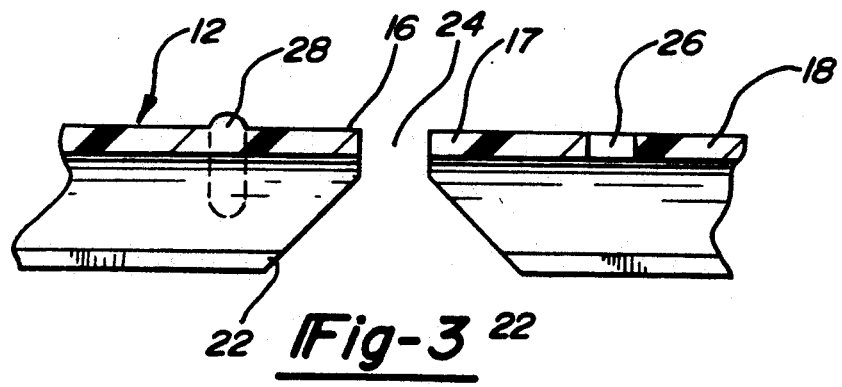
FIG. 3 is a cross sectional view taken though the section 3—3 shown in FIG. 2.

The tubular members 12 are disposed about the coil spring 8 by pulling the opposite side wall portions 20, 22 outward or apart, increasing a gap or opening 20 a sufficient amount to enable the tubular member 12 to be placed over the coil spring 8. As illustrated in FIG. 3, the first 16 and second 17 ends are beveled to provide for easy installation on the spring 8. As shown in FIG. 1, the respective tubular members 12 connected by the web member 14 are placed on the coil spring 8 such that the gaps or openings 20 in the respective tube members 12 are positioned opposite.

The majority of noise emitted during operation of the coil spring 8 occurs when the spring 8 is placed in a fully compressed condition, i.e. when the individual coils of the coil spring 8 come into metal to metal contact with one another. Additionally, as the spring is compressed the overall diameter increased, therefore it is desireable to form the tubular member 12 in a substantially planar configuration. As shown in FIG. 2, the substantially planar configuration provides a two-fold function, it provides maximum contact between the two tubular members 12 when the spring 8 is compressed and it prevents the tubular members 12 from being radially expanded during compression of the spring 8, thus reducing the potential for the tubular members 12 to work free of the spring 8.

While a gap 30 occurs between the tubular members 12 when the spring 8 is at a static position, as shown in FIG. 1, the gap 30 decreases when the spring 8 is compressed and increases when the spring 8 expands. During expansion of the spring 8 the web member 14 acts as a hinge member to help hold and retain the tubular members 12 on the spring 8. Additionally, the web member 14 prevents movement or creep, resulting from rotational movement or torque between the tubular members 12 and the spring 8 when the spring 8 expands and contracts.

In the preferred embodiment, the noise suppression member 10 is formed of a polyurethane having a 90 Shore A durometer. Alternatively, the noise suppression member 10 may be made from other elastomeric or flexible and resilient members as well, such as rubber or other suitable polymers. As shown in FIGS. 2 and 3, the tubular members 12 include drain holes 26 and raised portions 28. The drain holes 26 prevent moisture or fluid buildup. The raised portions 28 reduce surface area and therefore reduce plastic to plastic noise.

While the disclosed embodiment shows two circular or ring shaped tubular members 12 attached by a web member 14, additional tubular members 12 may be attached by web members such that the overall length of the noise suppression member 10 may be increased.

The noise suppression member 10 may be injection molded in a conventional manner without the need for additional or subsequent manufacturing steps. Thus, the process is cost effective and may be fully automatic.

It should be appreciated that the present invention provides a noise suppression member 10 which may be easily installed on a coil spring and which provides a long lasting, durable, and cost efficient means for reducing the noise occurring in a coil spring during operation of a vehicle suspension system.

Modifications and uses of the present invention will become apparent to one skilled in the art upon study of the specification, drawing, and claims.

What is claimed is:

1. A noise suppression apparatus for use with a spring comprising:
   a plurality of tubular ring members, each of said ring members severed along a radial axis and each of said ring members including a tube wall, said tube wall having a slit therein forming adjacent side walls; and
   a web member connecting said ring members.

2. An apparatus as set forth in claim 1 wherein said ring members are made of a elastomeric material.

3. An apparatus as set forth in claim 2 wherein said elastomeric material includes polyurethane having a Shore A durometer value in the range of 80-100.

4. An apparatus as set forth in claim 11 including said ring members having a plurality of holes in said tube wall.

5. An apparatus as set forth in claim 11 wherein an outer surface of said tube wall includes raised portions thereon.

6. An apparatus as set forth in claim 11 wherein said web member is made of a flexible resilient material.

7. A noise suppression apparatus for use with a spring having a defined shape when viewed along a longitudinal axis of said spring comprising:
   a plurality of tubular members, said tubular members of a shape corresponding to said defined shape such that said tubular members may be disposed about said spring;
   a web member connecting said tubular members; and
   each of said tubular members have a radial separation and include a tube wall, said tube wall having a slit therethrough.

8. An apparatus as set forth in claim 7 wherein said radial separation is positioned at a location 180° from said web member.

9. An apparatus as set forth in claim 8 wherein said tubular members include a plurality of holes therein.

10. An apparatus as set forth in claim 8 wherein said tubular members include raised portions thereon.

11. An apparatus as set forth in claim 10 wherein said tubular members are made from an elastomeric material.

12. An apparatus as set forth in claim 11 wherein said elastomeric material includes polyurethane having a Shore A durometer value in the range of 80-100.

13. A noise suppression apparatus for use with a coil spring comprising:
   a plurality of ring shaped tubular members, each of said tubular members having a slit extending the length of said tubular members;
   said tubular members having a radial separation forming first and second ends, said tubular members further having a plurality of holes and a plurality of raised portions positioned on the outer surface of said tubular members; and
   a web member interconnecting said tubular members.

* * * * *